United States Patent [19]

Calhoun et al.

[11] Patent Number: 5,449,540
[45] Date of Patent: Sep. 12, 1995

[54] PATTERNED PRESSURE SENSITIVE ADHESIVE TRANSFER TAPE

[75] Inventors: Clyde D. Calhoun, Stillwater, Wash.; David C. Koskenmaki, St. Paul, Minn.

[73] Assignee: Minnesota Mining and Manufacturing Company, St. Paul, Minn.

[21] Appl. No.: 135,915

[22] Filed: Oct. 13, 1993

Related U.S. Application Data

[62] Division of Ser. No. 758,744, Sep. 12, 1991, abandoned.

[51] Int. Cl.$^6$ ................................. C09J 7/02
[52] U.S. Cl. .................................. 428/42; 428/202; 428/343; 428/345; 428/352; 428/354
[58] Field of Search ............... 428/40, 42, 354, 200, 428/202, 173, 214, 345

[56] References Cited

U.S. PATENT DOCUMENTS

| | | | |
|---|---|---|---|
| 3,328,482 | 6/1967 | Northrup et al. | 260/825 |
| 3,741,786 | 6/1973 | Torrey | 117/3.1 |
| 3,997,702 | 12/1976 | Schurb et al. | 428/352 |
| 4,547,431 | 10/1985 | Eckberg | 428/413 |
| 4,822,687 | 4/1989 | Kessel et al. | 428/447 |
| 5,017,255 | 5/1991 | Calhoun et al. | 156/230 |
| 5,087,494 | 2/1992 | Calhoun et al. | 428/40 |
| 5,141,790 | 8/1992 | Calhoun et al. | 428/40 |

FOREIGN PATENT DOCUMENTS

| | | | |
|---|---|---|---|
| 0279579 | 2/1988 | European Pat. Off. | C09J 7/02 |
| 0382507 | 2/1990 | European Pat. Off. | C09J 7/02 |
| 0455463A1 | 4/1991 | European Pat. Off. | A61M 15/00 |
| 2507196 | 6/1981 | France | C09J 7/02 |
| 2559496 | 2/1984 | France | C09J 7/04 |
| 1245523 | 7/1960 | Germany | C09J 7/02 |
| 2-11684 | 6/1988 | Japan | C09J 133/08 |
| 1420743 | 12/1971 | United Kingdom | C09J 7/02 |
| 1384423 | 5/1972 | United Kingdom | C09J 7/02 |
| 2058664 | 9/1980 | United Kingdom | B32B 3/26 |
| WO91/13752 | 3/1991 | WIPO | B32B 7/10 |

*Primary Examiner*—Jenna L. Davis
*Attorney, Agent, or Firm*—Gary L. Griswold; Walter N. Kirn; Christine T. O'Shaughnessy

[57] ABSTRACT

A carrier web with recesses or pockets therein which contain pressure sensitive adhesive. The recesses in the carrier web maintain the adhesive in a discrete pattern during handling and storage and prevent lateral flow of the pressure sensitive adhesive under ambient conditions. The patterned adhesive may be transferred to an article directly from the recesses in the carrier by pressing the article onto the carrier web or indirectly by transferring the adhesive first to a cover sheet or to the flat backside of the web and thence to the article.

3 Claims, 2 Drawing Sheets

PATTERNED PRESSURE SENSITIVE ADHESIVE TRANSFER TAPE

This is a division of application Ser. No. 07/758,744 filed Sep. 12, 1991, now abandoned.

BACKGROUND

1. Field of the Invention

The invention relates to a pressure sensitive adhesive transfer tape and more particularly to a transfer tape having a carrier web and recesses in the web for the adhesive. The invention also relates to patterned adhesives and a method for forming and maintaining a patterned pressure sensitive adhesive until said adhesive is transferred to an article.

2. Description of Prior Art

Pressure sensitive adhesive (PSA) transfer tapes or double stick tapes find wide application in bonding two substrates or surfaces together because of the advantages offered over dispensing and applying adhesives from a tube or container. In using transfer tapes, it is often desired to transfer adhesive to the smaller of the two surfaces, such as a part, component or fastener, being bonded. Often, the objective is to cover as much of this surface with adhesive, so as to enhance the bond, but not to have adhesive extending beyond the perimeter of this surface.

A common method for accomplishing transfer of adhesive is to die cut the adhesive or adhesive and liner of a transfer tape to the shape of said surface such that the adhesive just covers the smaller of the two surfaces being bonded. The die cutting approach is widely used in industry despite the cost and complications of cutting and indexing the adhesive to the part. Die cutting becomes more difficult as the part either increases in complexity or is significantly reduced in size.

An alternate approach is to formulate an adhesive that readily shears through its thickness. In this case the adhesive is coated onto a carrier film. When the surface of a part or component is applied to the adhesive coated carrier film and separated therefrom, the adhesive shears, that is, tears through its thickness, leaving the adhesive only on the surface of the part or component. Such a transfer tape is available from Minnesota Mining and Manufacturing Company (3M) under the designation "Transfer Tape Product 909." Such tapes are generally limited to applications not requiring high performance adhesion, for example, as an assembly aid for mechanical fasteners.

Another method for getting adhesive only on the smaller of the two surfaces being bonded, such as a part or component, is to divide the adhesive into segments on the carrier web. When a part is placed in contact with these adhesive segments and then separated, only the segments contacted by the part will be transferred to the part.

U.S. Pat. No. 3,741,786 (Torrey) and British patent publication 1384423 to Avery Corp. is illustrative of segmented adhesive art. In both of these patents, the adhesive is applied to a carrier by conventional means such as rotogravure printing, silk-screen printing, intermittent extrusion of an adhesive melt and the like as well as direct coating of an adhesive layer with subsequent cutting and stripping of an adhesive matrix from the transfer tape or web to provide the substantially noncontiguous raised pressure sensitive adhesive segments. Torrey also teaches that the raised adhesive segments may be dots, diamonds, stars, triangles, or mixtures thereof and that the segmented adhesive transfer tape may be used in an automated or manual dispensing apparatus. Other examples of segmented adhesive transfer tapes of the general type taught by Torrey are British Patent Specification 1420743 (Ghavt), French Application of Patent of Invention No. 81 11285 (Euverte), European Patent Application 0279579 (Tanuma et al.) and Japanese Patent Office Kokai Patent No. HEI 2(1990)—11684.

One of the shortcomings of such prior art segmented adhesive transfer tapes is that in forming the adhesive pattern on the carrier film, there is a tendency for many pressure sensitive adhesives to slump and flow laterally. This problem is exacerbated when patterned adhesive segments are either closely spaced or exhibit a high ratio of height to width. After depositing the adhesive pattern on a carrier web it is normal practice in the balance of the manufacturing, distribution and use of these tapes to stack sheets of the tape or wrap the tape into a roll. The force on the raised non-contiguous adhesive segments is such that the segments have a tendency to move laterally under cold flow conditions, that is, under ambient conditions, such that a continuous adhesive sheet is formed. The extent of this shortcoming is expressed in the above cited prior art. For example, U.S. Pat. No. 3,741,786 (Torrey) at col. 4 lines 1 to 10 states: "The pressure sensitive adhesive segments should not, however, be spaced so closely that prior to application to a substrate they will be compressed and thereby caused to form uniform adhesive layer which no longer has a definable zone of separation due to compressive forces resulting from manufacturing and/or handling. This would preclude removing the carrier tape from the applied pressure sensitive adhesive without tearing, rupturing, stretching, stringing or cutting the transferred pressure sensitive adhesive." British Patent Specification 1420743, p. 2, lines 115–121 states: "The pressure-sensitive adhesive should be of a character which is capable of maintaining its physical shape under normal conditions likely to be encountered during handling and storage. Pressure sensitive adhesives which slump or flow are unsatisfactory for use in accordance with the invention." European Patent Application 0279579, at p. 3, lines 11–15 states that islands or irregular sections of pressure sensitive adhesive on a substrate tend to change over time due to the fluidity of the adhesive. This reference teaches that to overcome this tendency, crosslinking structures should be introduced into the adhesive. Japanese Kokai Patent No. HEI 2(1990)11684 points out that a problem with segmented adhesives is that it starts to flow immediately after coating on a support substrate causing disfigurement of the coating pattern even before polymerization treatment.

In efforts to counteract these difficulties, practitioners in the art have made comprises relative to adhesive selection, the spacing between adhesive segments and the height of the segments. In addition, when the adhesive itself is modified or selected to prevent lateral flow during handling and storage under ambient conditions, it becomes more difficult to form a continuous adhesive bond after transfer. This is because the same adhesive behavior that prevents lateral flow during handling and storage prevents lateral flow after bonding and lateral flow after bonding is desirable since it improves the adhesive bond. When bonding small components, it is desirable to have the adhesive segments small because the larger the adhesive segments, the more the adhesive will extend beyond the perimeter of the part and ultimately will limit the size of the parts for which the tape is useful. European Patent Application 0382507 p. 2, lines 42–43 states that the need to have the adhesive segments small makes such transfer sheets unsuitable for use in adhering small items.

U.K. Patent Application GB 2058664A discloses a rigid wallboard which has been embossed and the raised surface coated with an adhesive. A cover sheet is then bonded to the adhesive coated embossed fiber board. The adhesive disclosed in this reference is not transferred off the fiber board, it is simply a discontinuous adhesive on the embossed fiber board that bonds the cover sheet to it.

None of the above cited prior art, discloses a segmented pressure sensitive adhesive transfer tape made by putting adhesive into recesses or pockets of an embossed carrier web.

Accordingly it is desirable to provide a segmented pressure sensitive adhesive transfer tape that prevents lateral flow of the adhesive segments before transfer but, permits lateral flow of the adhesive segments after transfer and bonding such that continuous adhesive bonds may be formed.

It is desirable to provide an economical method for forming and maintaining a patterned pressure sensitive adhesive during manufacturing, distribution and storage that uses ordinary coating apparatus.

It is also desirable to provide a segmented pressure sensitive adhesive transfer tape that has closely spaced, small adhesive segments with controllable thicknesses wherein the adhesive segments are readily transferable to an article or substrate.

SUMMARY OF THE INVENTION

The invention provides a carrier web having recesses therein which contain pressure sensitive adhesive. In one aspect of the invention, the adhesive is transferable to an article from the recesses by pressing the article into contact with the adhesive and then removing the web. In another aspect, the carrier web containing adhesive filled recesses may be wound into a roll so that exposed adhesive in the recesses contacts the backside of the previous wrap of the carrier web. As the roll is unwound, adhesive transfers from the recesses to the backside of the carrier web. An article may then be pressed into contact with the exposed adhesive on the backside of the carrier web. Thereupon the adhesive transfers to the article when the article is pulled away from the carrier web. The recesses may be arranged in any desired pattern and are advantageously separated from one another. In such case the adhesive transferred to the article from the recesses will also be in the form of discrete and separate portions arranged in the same pattern as the recesses.

In yet another aspect of the invention, the recesses in the carrier web may be substantially continuous and filled with the adhesive. In such case the carrier web may contain a plurality of spaced apart projections protruding through the adhesive layer at intermittent points along the surface of the adhesive. When the article is pressed into contact with the exposed adhesive layer on the carrier web, the adhesive layer transfers to the article as the carrier web is pulled away from the article. The transferred adhesive in this case may have the appearance of a perforated adhesive film. When the recesses are discontinuous, i.e., separated and spaced apart from one another, they act as individual pockets or containers for the adhesive and allow the adhesive to be patterned into individual segments. This prevents lateral cold flow of the adhesive during handling and storage. (Lateral cold flow is the tendency of adhesive segments to gradually flow in the lateral direction without heating, that is, under ambient conditions.) The adhesive pattern is determined by the pattern of the recesses in the carrier web and the adhesive thickness is determined by the depth of the recesses in the embossed carrier. The adhesive can be coated into the recesses of the carrier using conventional coating methods.

The recesses in the carrier web can be made by a number of processes, examples of which are thermal embossing, cast embossing, laser drilling and by etching the surface of the carrier with a reactive material.

The adhesives used in the invention can extend over a wide range in types and viscosities because the recesses prevent lateral flow of the adhesive. Suitable pressure sensitive adhesives can be selected from a wide variety of adhesives including silicones, polyolefins, polyurethanes, polyesters, acrylates, rubber-resin and polyamides.

DETAILED DESCRIPTION

Figure 1:
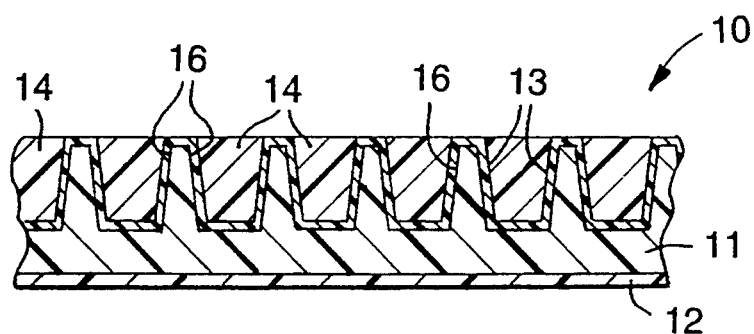
FIG. 1 is a schematic cross-sectional view of a first patterned PSA transfer tape of the invention.

A preferred embodiment of a patterned transfer tape 10 of the invention is shown in FIG. 1. Tape 10 is composed of flexible carrier web 11 which has been embossed to have a plurality of recesses on one side and a flat surface on the backside. The backside of the embossed carrier web has been coated with a release coating 12 and the recessed front side has been coated with release coating 13. A pressure sensitive adhesive 14 has been coated into the recesses by flooding the surface with adhesive and then wiping with a doctor blade. When the tape is stacked in sheets or wound into a roll and then unwound the adhesive remains in the recesses 16 of the embossed film. The greater contact area between the adhesive and the recesses than between the adhesive and the flat backside of the embossed web tends to cause the adhesive to remain in the recesses. By selecting release coatings 12 and 13 such that coating 12 provides a lower level of release than coating 13, where release coating 12 is often referred to as a "premium" (easiest) release, the adhesive segments will remain in the recesses of the embossed film. In this construction 10 of the tape, the adhesive is transferred directly from the recesses of the embossed film to the transfer substrate or part. This may be accomplished by pressing the part onto exposed adhesive 14. When the part is removed, adhesive 14 transfers thereto from recesses 16. The transferred adhesive will have a pattern, typically of spaced-apart adhesive segments, in conformity with the pattern of recesses 16.

In another preferred embodiment (FIG. 2) there is shown a patterned PSA transfer tape 20 that has an embossed carrier web 21 embossed such that the recesses 16 on one side have corresponding projections on the other side. The recesses 16 have been coated with release coating 113. A cover sheet 22 has been coated with release coating 112. During the coating of adhesive 14 into the recesses 16 an excess of adhesive is coated onto the embossed carrier web 21. The adhesive filled embossed carrier web 21 along with cover sheet 22, is then passed between two nip rolls such that the adhesive 14 fills the recesses 16 and laminates the cover sheet 22 to the embossed carrier web 21. Transfer tape 20 may be stacked in sheets or wound in a roll. Release coatings 112 and 113 are selected so that when the cover sheet 22 is removed from the embossed carrier web 21 the adhesive 14 remains in recesses 16. The adhesive 14 is then transferred from the embossed carrier web 21 to an article when the article is pressed onto the exposed adhesive 14 and the article is then removed from carrier web 21.

Figure 2:
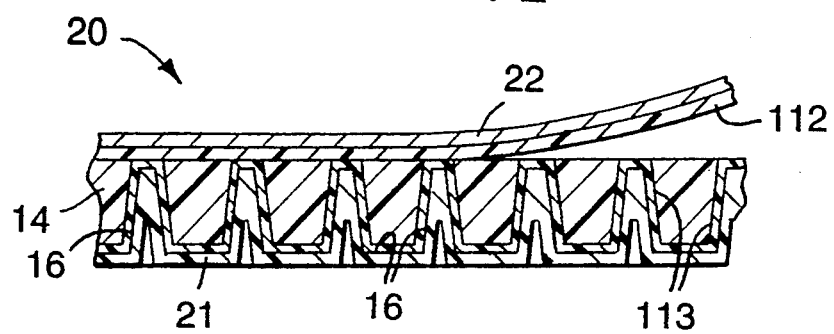
FIG. 2 is a schematic cross-sectional view of a second patterned PSA transfer tape of the invention.

When coating pressure sensitive adhesive out of solution and using construction 20 of FIG. 2, it may be necessary to coat and dry the adhesive 14 prior to laminating cover sheet 22 unless the cover sheet provides for drying of the solvent such as by being porous. Also, it may be advantageous to make more than one coating pass or use an expanding agent so as to facilitate subsequent transfer of the adhesive to a substrate or article to which the adhesive is intended to be transferred.

Figure 3:
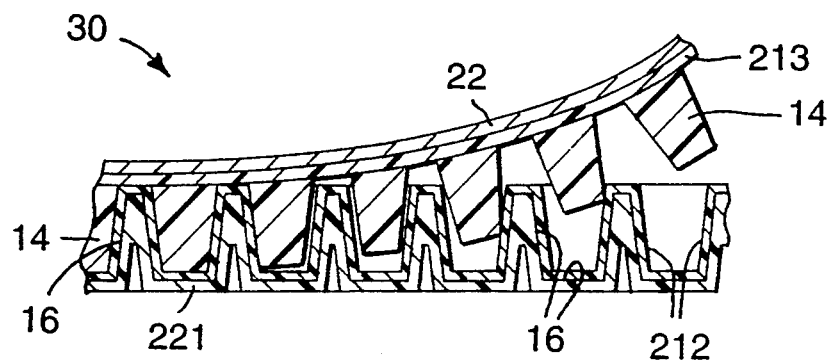
FIG. 3 is a schematic cross-sectional view of a third patterned PSA transfer tape of the invention.

In the embodiment of FIG. 3 there is shown an alternate patterned pressure sensitive adhesive transfer tape 30. The embossed carrier web 221 has been coated with release coating 212 and cover sheet 22 has been coated with release coating 213. Transfer tape 30 may be stacked in sheets or wound in a roll. The release values (peel adhesion, dyne/cm) of coatings 212 and 213 are selected such that when cover sheet 22 is separated from embossed carrier web 21 the patterned pressure sensitive adhesive 14 is transferred from the embossed carrier web 221 to cover sheet 22. The adhesive is then transferred to a receiving part from cover sheet 22.

Figure 4:
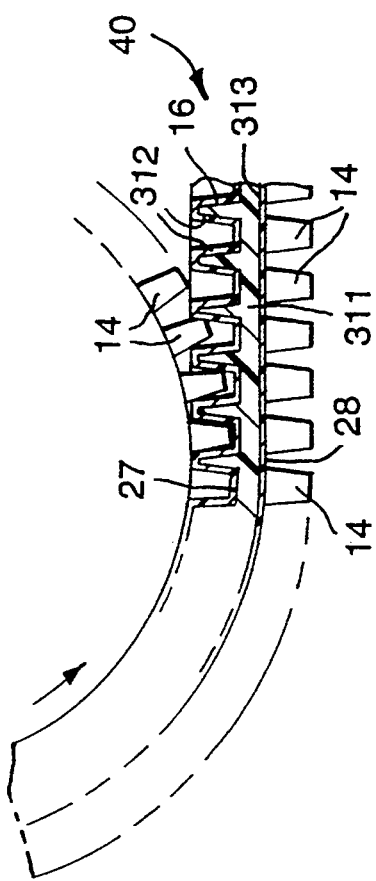
FIG. 4 is a schematic cross-sectional view of a fourth patterned PSA transfer tape of the invention.

In the embodiment of FIG. 4, there is shown another construction of the transfer tape of the invention. In this embodiment transfer tape 40 has an embossed carrier web 311 which has been coated with release coating 312 on its recessed side 27 and with release coating 313 on its flat back surface 28. Release coatings 312 and 313 are selected such that after filling the recesses 16 of the embossed carrier web 311 with adhesive, wrapping the tape in a roll and then unwrapping, the patterned PSA 14 transfers to the flat backside 28 of the embossed carrier web 311 as shown in FIG. 4. The recesses 16 in the embossed carrier web 311 are now substantially void of adhesive. The patterned adhesive may then be transferred to a receiving article (e.g. a substrate or object) by contacting the exposed adhesive 14 with the article and then separating the article from the embossed carrier web 311. The adhesive 14 becomes transferred from the flat backside 28 of the embossed film to the receiving article in any given area defined by mutual contact.

Figure 5:
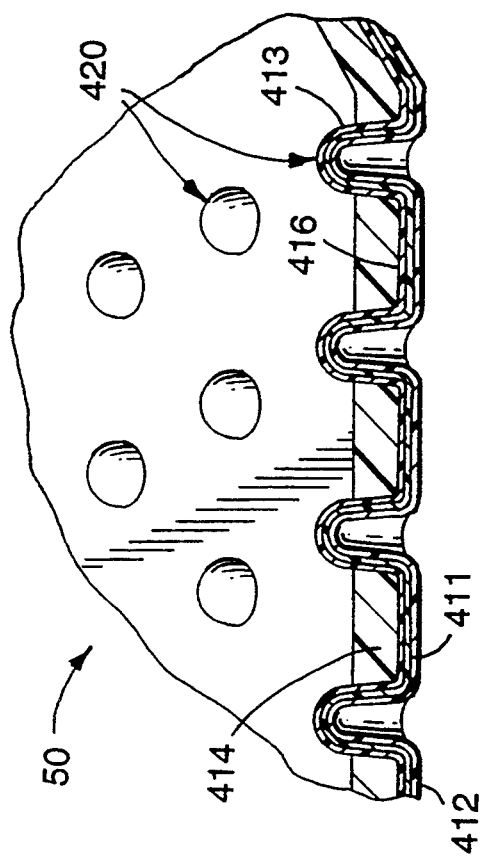
FIG. 5 is a schematic pictorial view of a fifth patterned PSA transfer tape of the invention.

In the embodiment of FIG. 5, there is shown a transfer tape 50 having an embossed carrier web 411 that is embossed to form a continuous recess 416 containing a layer of pressure sensitive adhesive (PSA) 414. The frontside of web 411 is precoated with release layer 413 over which is coated a pressure sensitive adhesive 414. The backside of web 411 is coated with release coating 412. A plurality of spaced-apart projections 420 of carrier web 411 may appear protruding through the continuous PSA layer 414 at intermittent points along the surface of PSA layer 414 as illustrated in FIG. 5. The projections 420 may have any desired shape, dimension and pattern. The adhesive 414 transferred from such a tape construction will be substantially continuous and have intermittent void regions caused by projections 420. For example, an adhesive 414 transferred from an embossed carrier web 411 having a regular array of isolated projections 420, would appear as a perforated adhesive film. When the adhesive 414 is transferred to an article the perforations in the film can permit air and liquid to pass through the film, thus making the adhesive suitable for applications requiring passage of liquids or vapors. Transfer tape 50 may be stacked in sheets or wound in a roll. If wound in a roll, release coating 412 permits easy unwinding without causing sticking of adhesive 414 to the backside of tape 50.

The patterned PSA transfer tapes of this invention may also be of an almost infinite number of patterns consisting of various combinations of adhesive segments and regions where the adhesive surrounds regions void of adhesive.

As stated above, the type of adhesive used in the patterned PSA transfer tapes of this invention is not critically limiting. A wide variety of coatable pressure sensitive adhesives can be used. However, it is preferred to use solventless curable adhesives (often referred to as 100% solids) when making segmented PSA transfer tapes and latex PSA's coated out of water when making patterned PSA transfer tapes that are continuous adhesive films having discontinuous holes. Classes of adhesives that can be used in this invention are silicones, polyolefins, polyurethanes, polyesters, acrylics, rubber-resin and polyamides. Suitable pressure sensitive adhesives includes solvent-coatable, hot-melt-coatable, radiation-curable (E-beam or UV curable) and water-based emulsion type adhesives that are well-known in the art. Specific examples of preferred types of adhesives include acrylic-based adhesives, e.g., isooctyl acrylate/acrylic acid copolymers and tackified acrylate copolymers; tackified rubber-based adhesives, e.g., tackified styrene-isoprene-styrene block copolymers; tackified styrene-butadiene-styrene block copolymers; nitrile rubbers, e.g., acrylonitrile-butadiene; silicone-based adhesive, e.g., polysiloxanes; and polyurethanes. The pressure-sensitive adhesive may also be substantially nontacky at room temperature if it becomes tacky at an elevated temperature at which it is to be used. Acrylics are a preferred class of adhesives for the transfer tape of the invention. Wide variations in chemical composition exist for the acrylic adhesive class, examples of which are disclosed in U.S. Pat. Nos. 4,223,067 (Levens) and 4,629,663 (Brown et al.).

The release characteristics of the release coatings, e.g., 12 and 13 (FIG. 1), 112 and 113 (FIG. 2), 212 and 213 (FIG. 3), 312 and 313 (FIG. 4) 412 and 13 (FIG. 5) can be adjusted by known methods.

An applicable method for increasing peel adhesion values in silicone release coatings for use in the above referenced coatings of the invention is by blending a silicone composed of polydimethysiloxane with less effective release material as disclosed in U.S. Pat. Nos. 3,328,482, (Northrup) and 4,547,431 (Eckberg). Another method for modifying such silicone release coatings is to chemically modify the silicone itself to increase the non-silicone content of the coating as described in U.S. Pat. Nos. 3,997,702 (Schurb) and 4,822,687 (Kessel). By employing such methods, the peel values for pressure sensitive adhesives can be readily increased from 10 g/cm of width to several hundred g/cm of width to adjust the ease of transfer of the adhesive from the embossed carrier web of the invention.

As in coating conventional continuous layers of adhesive, the viscosity of the adhesive has to permit the coating operation to function, i.e., the viscosity must be low enough to permit filling the recess in the embossed carrier web. In some instances there can exist a thin layer of continuous adhesive film connecting the adhesive segments, but because these films are generally very thin, they do not have a deleterious effect on the performance of the transfer tape.

When coating adhesives out of solution, it is necessary to permit drying of the solvent before wrapping the tape in a roll or applying an adhesive transfer cover sheet or a release liner cover sheet. If the dried adhesive is sufficiently below the raised surface portion of the embossed web that the component cannot contact the adhesive segments, it may be necessary to tandem coat (fill the recess with two or more coating and drying passes) or use an expanding agent. A number of expanding agents may be used, such as blowing agents, to expand the adhesive but a preferred one is EXPANCEL 551DU from Nobel Industries, Sundsvall, Sweden. EXPANCEL consists of expandable microspheres having a shell consisting basically of a copolymer of vinylidene chloride and acrylonitrile, which shell encapsulates a blowing agent (liquid isobutane) under pressure. Examples of additional blowing agents useful in expanding pressure sensitive adhesives are given in U.S. Pat. No. 3,565,247 (Brochman), which is incorporated herein by reference.

If desired, particulates may be added to the adhesive prior to coating into the recesses. For example, conductive particles such as silver coated glass beads may be added to provide adhesive bonding and electrical conduction.

In another variation of the invention, two different adhesives may be coated into separate recesses, for example alternating rows of the recesses such that when a component contacts the adhesive segments, segments of more than one type of adhesive is transferred to the component. The advantage to this embodiment is that two adhesives may be combined to get utility not possible from either of the adhesives when used alone. In yet another variation two or more adhesives having different properties may be coated in tandem into the same recesses. For example a pressure sensitive adhesive of greater adhesion may be coated onto a removable pressure sensitive adhesive first applied to the recesses. In place of the removable pressure sensitive adhesive the first coat may be a heat activatable thermosetting adhesive.

Although the material used for the embossed carrier web is not critical to the invention, thermoplastic films used alone or as coatings on a substrate, such as paper or another polymer film, are preferred. Advantageously the thermoplastic film may be polyethylene and polypropylene. Especially useful are thermoplastic films which can be cast onto a master surface that is formed with protrusions to be replicated to form recesses in one side of the carrier web while leaving the other side smooth. Useful replicating techniques include that disclosed in coassigned U.S. Pat. No. 4,576,850 (Martens), incorporated herein by reference. A release coating such as a silicone based release is applied to the recessed side of the carrier web before the adhesive is coated into the recesses.

The size and shape of the recesses in the embossed carrier web is not normally critical but should be selected to match the intended application. The depth of the recesses is also not critically limited but is normally less than 0.25 mm as are the thicknesses of typical available transfer adhesives. However, practice of the invention need not be so limited and one of the important aspects of the invention is the ability to provide very thick patterned transfer adhesives. The three dimensional shape of the recesses can easily be controlled if desired and tailored to specific applications. The three dimensional shapes have a cross-section which may be oval, circular, polygonal or rectangular, wherein the cross-section is taken parallel to the surfaces of the carrier web. For example, the recesses could be shaped like inverted pyramids to provide pointed adhesive segments. Then the amount of bonding could be varied by the amount of pressure applied to the part to be bonded as each pyramid of adhesive flattens.

The following are representative examples of preferred embodiments of the invention. (All parts given are by weight.)

EXAMPLE 1

This example is illustrative of the embodiment shown in FIG. 3. A 0.1 mm polyethylene film web was male/female embossed to have about four diamond shaped recesses per centimeter. The depth of the recesses was 0.175 mm. The short axis and all sides of the diamond were 1.9 mm; the long axis was oriented in the longitudinal direction of the film. The diamond shaped recesses were separated by 0.476 mm wide intersecting ridges that ran at 30 degrees to the length of the film. The recessed side of the film was coated with a silicone (polysiloxane) based release by Daubert Coated Products, Inc. of Willowbrook, Ill. This silicone release is available from Daubert Co. under the product designation number 164Z.

The recesses were filled with a solventless UV curable acrylic PSA which contained 90 parts by weight isoctylacrylate and 10 parts acrylic acid. This is the same composition as disclosed in Levens U.S. Pat. No. 4,223,067, Example 4 but without including any microspheric glass bubbles. The physical properties of this adhesive after UV curing is disclosed in Levens U.S. Pat. No. 4,233,067 herein incorporated by reference. The method of filling the recesses in the film was to spread the uncured adhesive across the film in excess. The embossed carrier web and a cover sheet were then laminated together by passing between a steel and 70 Shore A-2 Durometer rubber roll. The cover sheet was a polyethylene terephthalate (PET) film coated with a silicone release. The specific silicone coated PET film used was obtained from the Toray Industries, Inc., of Japan under the Toray product designation "Cerapeel" film which was 0.05 mm thick and was coated on one side with a Toray designated "BK" silicone release. The pressure between the nip rolls was adjusted so that little or no adhesive remained on the raised surface portion of the embossed carrier web. The assembly was then placed 5 cm from a desk lamp (Dayton 2V346E), which contained two 46 cm long UV lamps (General Electric F15T8 BL). The adhesive was cured using an exposure time typically of about 5 minutes. The embossed recesses prevented the cured adhesive from lateral flow under ambient conditions. The tape was then wound into a roll.

When the adhesive tape was unwound and the cover sheet was separated from the embossed carrier web, the adhesive transferred as segments onto the cover sheet. A variety of parts/substrates selected to be representative of different materials and geometric shapes, i.e., aluminum discs, steel rings, wood cylinders and glass slides, were pressed against the adhesive segments and then separated from the cover sheet. Only those adhesive segments contacted by the parts/substrates were removed from the cover sheet.

Room temperature 180 degree peel tests were performed at crosshead rates of 30 and 229 cm/min to compare the release of the adhesive from the embossed carrier web to its release from the cover sheet. At a peel rate of 30 cm/min the average peel force for removing the adhesive from the embossed carrier web was 10 N/m of width compared to 35 N/m of width for removing the adhesive from the cover sheet. At 229 cm/min, the average peel forces were 10 and 24 N/m of width for the embossed carrier web and the cover sheet, respectively. The procedure was to cut 2.54 cm strips in a downweb direction, i.e. parallel to the long axis of the diamond shaped segments and to separate the assembly or laminate using a Mass Peel Tester (Model SP-102-3M90) from Instamentors, Inc., Strongsville, Ohio. In some tests the cover sheet was pulled from the embossed carrier web containing adhesive filled recesses and in other tests the cover sheet was fixed and the embossed carrier web was pulled from it. In each variation, the adhesive segments transferred to the cover sheet. The adhesive segments were then transferred to either aluminum or polyethylene terephthalate (PET) film by pressing the aluminum or PET film onto the adhesive segments on the cover sheet and then removing the cover sheet.

EXAMPLE 2

This example is illustrative of the embodiment shown in FIG. 1. The embossed carrier film of Example 1 was coated with "Syl-Off" 23 silicone release from Dow Corning Corporation. The recesses in the carrier were filled with 48% solids acrylic pressure sensitive adhesive (70% isooctyl acrylate, 15% acrylated CARBOWAX 750 from Union Carbide, 15% acrylic acid, <0.5% acrylated benzophenone) from a solvent consisting of 60% ethyl acetate, 30% isopropanol and 10% toluene.

This adhesive was coated into the recesses by flooding the surface of the embossed carrier web with an excess of adhesive and wiping with a doctor blade. The adhesive was dried at 65° C. The recesses in the embossed carrier web prevent lateral flow of the adhesive. When an article such as polyethyleneterephthalate film or aluminum was pressed into contact with the adhesive filled embossed carrier web and then separated from said web, the adhesive segments contacted by the article transferred from the embossed carrier web to the article. The article with transferred adhesive segments thereon was then adhesively attached to a variety of substrates or other articles emcompassing the general material classes of metals, ceramics and polymers.

In order to demonstrate the dispensability of the adhesive from the recesses of the embossed carrier web, a length of this transfer tape was slit and laminated to SCOTCH 924 transfer tape available from 3M. This tape construction was loaded into an adhesive transfer applicator gun (SCOTCH 752 ATG applicator gun available from 3M). The patterned adhesive of this example was transferred from the embossed carrier web to glass, paper and aluminum without stringing of adhesive or tearing of the paper.

EXAMPLE 3

This example is illustrative of the embodiment shown in FIG. 3. This example is similar to Example 1, except that a different embossed polyethylene web was used. This film was 0.1 mm thick and male/female embossed to have about 16 recesses per cm; each recess was a truncated four sided pyramid. The depth of the recesses was 0.13 mm; the dimensions of the squares at the top and bottom of the recesses were 0.65 mm and 0.35 mm, respectively. The ridges separating the recesses were 0.1 mm at the top and 0.3 mm at the bottom. The female side of the embossed web was solvent coated with "Syl-Off" 292 silicone (Dow Corning Corporation) using an air knife coater. This silicone release solution consisted of 2% solids in a solvent consisting of 90% "Penola" 100 (Simonsons C. F., Sons; Philadelphia, Pa.), 5% isopropanol and 5% toluene. The adhesive of Example 2 was coated into the recesses of the embossed carrier web of this example using the procedure of Example 1. The cover sheet was the same as in Example 1. Examination of the transferred adhesive segments on the cover sheet with a light microscope disclosed that a few of the segments were bridged by very thin ribbons of adhesive. These isolated adhesive bridges did not impede the transfer of the adhesive segments to parts/substrates.

EXAMPLE 4

This example is illustrative of the embodiment shown in FIG. 2. Using the same silicone coated polyethylene carrier web as in Example 1, one part of the adhesive of Example 1 was mixed with two parts of electrically conductive particles which were silver coated nickel flakes sieved to less than 38 microns. These electrically conductive particles are available from Novament Specialty Products Corporation of Wyckoff, N.J. A polyethyleneterephthalate (PET) cover sheet of 0.05 mm thickness was coated with a silicone (polysiloxane) release coating available from Dow Corning Corporation under the product number "Syl-Off" 292. Separation of the cover sheet from the embossed carrier web left the particle filled adhesive segments in the embossed carrier web. The exposed adhesive segments were transferred to a 1.27 cm diameter aluminum disk by contacting the embossed carrier web with aluminum and then removing the disk from the web. The transferred adhesive segments on the disk were used to bond and electrically connect the disk to a second disk by simply pressing the two disks together. The electrical resistance of the bond was measured with a volt ohm meter and found to be 10 ohms.

EXAMPLE 5

This example is illustrative of the embodiment shown in FIG. 1. The same silicone coated embossed carrier web as described in Example 1 was coated with a latex adhesive of about 55% solids consisting of 87% octyl acrylate, 12% octyl acryamide and 1% sodium styrene sulfamate. This adhesive is disclosed in detail in Example 4 of U.S. Pat. No. 4,629,663 (Brown et al.), the disclosure of which is incorporated herein by reference. The adhesive was coated into the recesses of the embossed carrier web and dried in air at room temperature. The dry thickness of the adhesive was only slightly less than the depth of the recesses, yet, most all of the tips or ridges between the recesses were free of adhesive. (Because the sample was made as a hand spread, some of the ridges were covered with adhesive after drying.) Segments of adhesive were transferred to a 1.27 cm diameter aluminum disk by pressing the disk onto the exposed adhesive and then removing the disk. The disk with transferred adhesive thereon was attached to a 37 micron thick PET film so that the sample could be used for demonstration. The clear PET allowed for easy viewing of the adhesive segments.

EXAMPLE 6

This example is illustrative of the embodiment shown in FIG. 5. A male/female embossed polyvinylchloride carrier web (designated "POLYTHERM" UG 45/60201) was obtained from Lake Crescent, Inc., Fairlawn, N.J., and coated with silicone release. This silicone release coating solution was as described in Example 3 except that it was further diluted to 0.1% solids. This solution was sprayed onto the embossed film until the film was just wet and then air dried. The method of spraying was to use a "Preval" powder unit available from Precision Valve Corporation, Yonkers, N.Y. This embossed carrier web had about 6 projections per cm arranged in a square lattice array to provide 36 projections/cm$^2$. Each projection was about 0.25 mm high, 1.27 mm at the base and with a rounded top. The latex adhesive of Example 5 was coated onto the embossed carrier web to the approximate height of the projections. The dry thickness of the adhesive was only slightly less than that of the projections, yet the tips of the projections were free of adhesive. The adhesive was transferred from the embossed carrier web to a 50 micron thick polyethyleneterephthalate (PET) film by applying the PET film to the carrier web and then separating the PET film from the embossed carrier web. The holes in the adhesive film (appearing as perforations) were present after transfer. PET was used as the transfer substrate because it provided a good substrate for examination with a light microscope using transmitted light.

EXAMPLE 7

This example is illustrative of the embodiment shown in FIG. 4. The backside or male side of the embossed carrier web of Example 1 was bonded to the nonrelease side of the coversheet of Example 1 using an adhesive transfer tape (Tape No. 9732 from 3M). This provided a web construction that had a flat backside and a recessed side. The silicone coating on the recessed side provided easier release than that on the flat backside. The embossed carrier web of this example was wrapped on an 8 cm diameter roll with the flat side out. The adhesive of Example 1 was applied in excess to the recessed side of the embossed carrier web at the nip. Sufficient pressure was applied to the smooth side of the embossed carrier web with a pack roll to force the raised surface portion of the embossed carrier web into contact with the flat backside of the prior wrap. The adhesive was pushed forward at the nip as a rolling bank, filling the recesses with adhesive. The UV lights of Example 1 were projected onto the flat backside of the embossed carrier at a distance of about 5 cm such that the adhesive was exposed for about five minutes.

After several wraps, the tape was unwrapped and the adhesive segments transferred from the recesses of the embossed carrier web to the flat backside of the embossed carrier web. Contacting the adhesive segments with an article and then separating the article from the embossed carrier web, transferred the adhesive segments to the article.

EXAMPLE 8

This example is illustrative of the embodiment in FIG. 3. The embossed web was the same as in Example 1 and the recessed side of the web was coated with the same silicone release as described in Example 1. The adhesive was the same as described in Example 1 except that the UV initiator was reduced from 0.1 g to 0.04 g. The UV cure was the same as in Example 1 except that the time was 20 min. Segments of adhesive were transferred from the embossed carrier web to aluminum sheets 4 cm by 5 cm by 1.5 mm by applying each aluminum sheet to the exposed adhesive segments and then removing the embossed carrier web from the aluminum. Four glass slides were bonded to the aluminum sheets by means of the adhesive segments. These samples were studied for cold flow of the adhesive segments. One sample was tested at 75° C. for 45 min. under a stress of 6.4 kPa. After removing this sample from the oven, it was observed that many of the adhesive segments had flowed laterally so as to form regions having a continuous adhesive film, thereby improving the adhesive bond. The remaining three samples were tested at room temperature under stresses of 0.4, 9.9 and 50 kPa. Examination of these samples after 3 hrs., 2 days and 23 days revealed the adhesive segments had flowed laterally after 3 hrs. at stresses of 9.9 and 50 kPa. After 23 days, the sample with 0.4 kPa (stress from the weight of the glass slide) had a number of the adhesive segments that had flowed laterally to form a continuous adhesive film. The recesses in the embossed web prevent lateral flow of the adhesive under ambient conditions and prior to transfer, that is, while the adhesive was retained within the recesses.

Although the invention has been described with respect to specific preferred embodiments, it should be appreciated that other embodiments utilizing the concept of the present invention are possible without departing from the scope of the invention. The invention, for example, is not intended to be limited to the specific release coatings and adhesives disclosed in the preferred embodiments. The invention thus, is not intended to be limited to the preferred embodiments described herein, but rather the invention is defined by the claims and equivalents thereof.

We claim:

1. An adhesive transfer tape comprising:
   a) a carrier having two oppositely parallel surfaces wherein one of said surfaces comprises at least one recess having a major surface which is substantially continuous and interrupted by protrusions penetrating therethrough, and
   b) in said at least one recess, a normally pressure sensitive adhesive which has been perforated by said protrusions, wherein as an article is pressed into contact with exposed adhesive in said recesses, the adhesive transfers to the article as said article is lifted from the tape.

2. The adhesive transfer tape of claim 1 wherein said protrusions result in perforations in the adhesive upon transfer to the article and wherein said perforations provide spaces for liquids and gases to pass through said adhesive.

3. The adhesive transfer tape of claim 1 wherein said protrusions are arranged in a pattern.

* * * * *

UNITED STATES PATENT AND TRADEMARK OFFICE
CERTIFICATE OF CORRECTION

PATENT NO. : 5,449,540
DATED : September 12, 1995
INVENTOR(S) : Calhoun et al.

It is certified that error appears in the above-indentified patent and that said Letters Patent is hereby corrected as shown below:

Col. 6, line 57          "13" should be --413--

Signed and Sealed this

Twenty-third Day of January, 1996

*Attest:*

BRUCE LEHMAN

*Attesting Officer*      *Commissioner of Patents and Trademarks*